United States Patent [19]

Bosshard

[11] 4,281,954

[45] Aug. 4, 1981

[54] APPARATUS FOR IRRADIATION OF PIECE GOODS

[75] Inventor: Ernst Bosshard, Winterthur, Switzerland

[73] Assignee: Sulzer Brothers Limited, Winterthur, Switzerland

[21] Appl. No.: 910,096

[22] Filed: May 30, 1978

[30] Foreign Application Priority Data

May 27, 1977 [CH] Switzerland ..................... 6545/77

[51] Int. Cl.³ ............................................. B65G 65/00
[52] U.S. Cl. ..................................... 414/287; 198/425
[58] Field of Search ............. 414/152, 154, 155, 157, 414/158, 172, 217, 287; 198/425; 204/242

[56] References Cited

U.S. PATENT DOCUMENTS

| 1,330,090 | 2/1920 | Plock | 414/154 |
|---|---|---|---|
| 2,438,064 | 3/1948 | Loux | 414/152 X |
| 3,125,232 | 3/1964 | Brinkman et al. | 414/217 |
| 3,428,197 | 2/1969 | Fischer et al. | 414/217 |
| 3,564,241 | 2/1971 | Brown | 198/425 |
| 4,081,348 | 3/1978 | Anderson | 204/242 |

Primary Examiner—Stephen G. Kunin
Assistant Examiner—Lawrence E. Williams
Attorney, Agent, or Firm—Kenyon & Kenyon

[57] ABSTRACT

The conveying apparatus for the bi-level irradiation chamber has a lifting device which cooperates with a bi-level rotary lock to introduce individual articles (piece goods) into the lock and to remove the articles from the lock. The lifting device allows an individual article to roll into one level of the lock while positively blocking entry of the following articles. Individual trollies are used to convey the articles within the irradiation chamber. The lifting device employs a catch to hold a trolley in position in the rotary lock to receive an article as well as a release device to release the catch after an article has been placed on a trolley.

13 Claims, 5 Drawing Figures

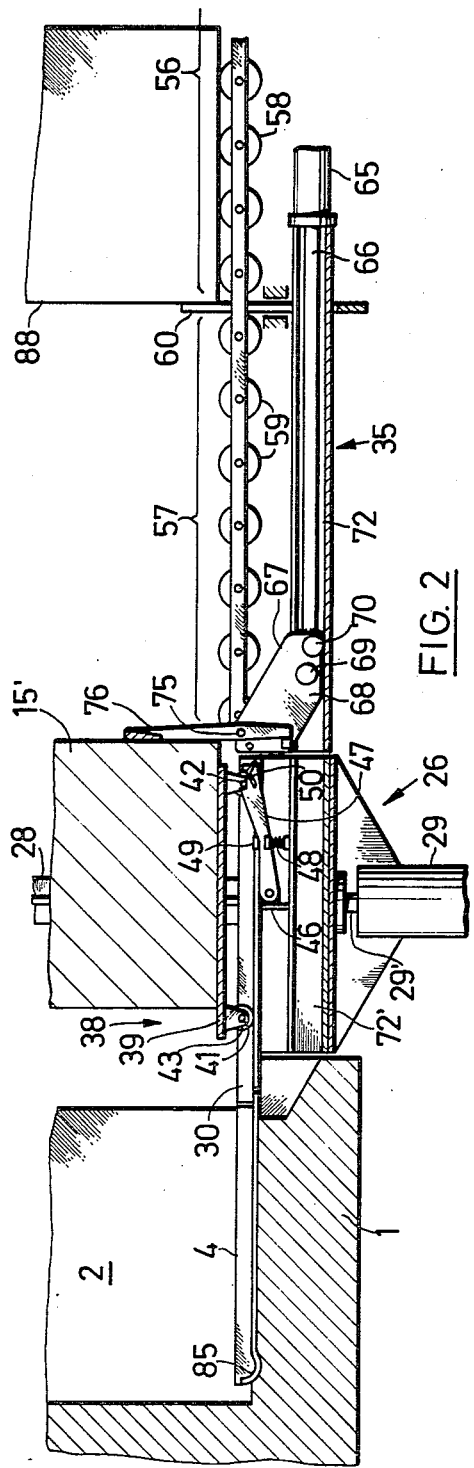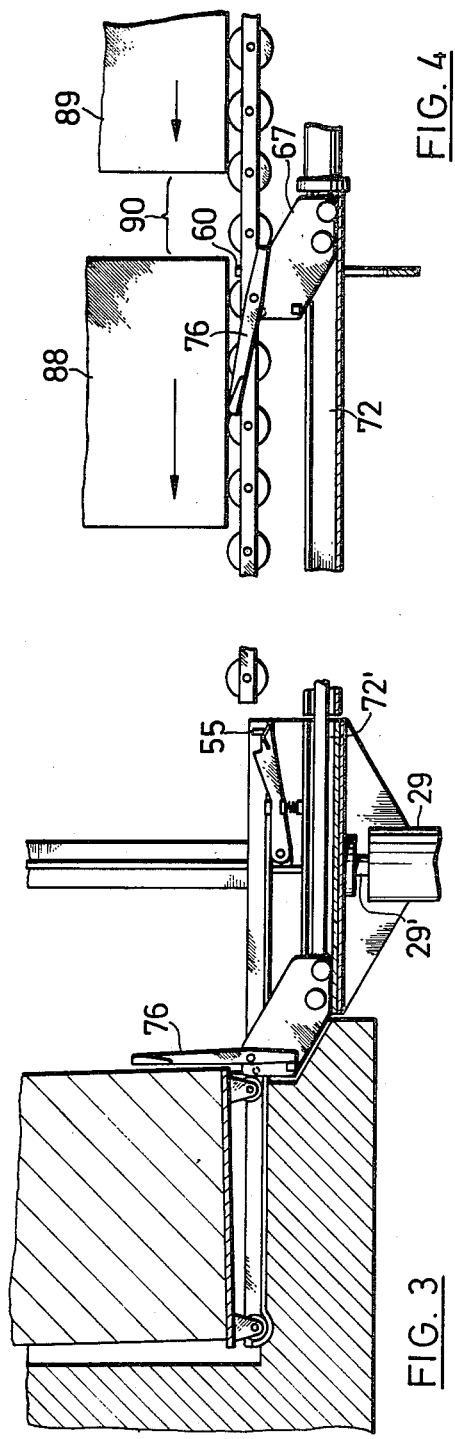

APPARATUS FOR IRRADIATION OF PIECE GOODS

This invention relates to an apparatus for irradiation of piece goods. More particularly, this invention relates to an apparatus for irradiation of a conveyed sequence of piece goods.

As is known there are many types of systems for irradiating articles in the form of piece goods for example as described in U.S. Pat. No. 4,081,348 and 3,564,241. Generally, such systems have an irradiation chamber, conveying means disposed in the chamber for conveying the piece goods around an irradiation wall on two levels, and a two-level rotary lock disposed in a wall of the irradiation chamber; the articles entering the chamber via one of the lock levels and leaving the chamber via the other lock level.

In a known apparatus as described in U.S. Pat. No. 4,081,348 and Swiss Pat. No. 582,404, the portions of piece goods, which portions are usually in the form of cardboard boxes containing a material to be irradiated, move around an irradiation wall on metal ways. However, the movement along these ways causes an abrasion which may upset the operation of the irradiation facility and thus make maintenance of the installation difficult. Further, the boxes may be disturbed as they move around and even start to leak.

Accordingly, it is an object of the invention to provide an irradiation apparatus in which there is very little abrasion of the conveyed articles.

It is another object of the invention to reduce the force necessary to move a sequence of piece goods into and through an irradiation chamber.

It is another object of the invention to reduce the risk of damage to piece goods which are conveyed within an irradiation chamber.

It is another object of the invention to reduce the risk of damage to piece goods which are conveyed within an irradiation chamber.

It is another object of the invention to provide an irradiation apparatus which is capable of irradiating piece goods in a relatively economic and easily transportable manner.

Briefly, the invention provides an apparatus for irradiation of piece goods wherein the apparatus has an irradiation chamber and a conveying means in the chamber including a plurality of trollies for conveying a sequence of piece goods through two levels within the chamber. The apparatus also has a rotary lock with two levels, one of which is disposed to permit entry of a trolley from the outside while the other is disposed to permit exit of a trolley to the outside. Also, a lifting means is provided for conveying a trolley between the two levels of the rotary lock. This lifting device is disposed immediately adjacent the rotary lock.

Advantageously, the rotary lock and lifting means each have a pair of rails on which the trollies can run and which register with one another in the end positions of the lifting device.

The lifting means can have a trolley-locking device which operates upon the arrival of a trolley and releases after a piece goods for irradiation has been pushed on to a trolley.

The apparatus also has a pushing means for pushing a respective piece goods onto a trolley on the lifting means. This pushing means also carries a means for releasing the trolley-locking device after a piece goods has been pushed onto the trolley. The pushing means is then able to push the trolley with the piece goods thereon into the rotary lock.

The rotary lock can have a means for releaseably securing the trollies so as to retain the trolley as the rotary lock rotates.

The pushing means includes a reciprocally mounted pusher rod and a stationary guideway having the rod movably mounted therein while the lifting means includes a guideway for registering with the guideway of the pushing means in order to guide the rod therein.

These and other objects and advantages of the invention will become more apparent from the following detailed description taken in conjunction with the accompanying drawings in which:

FIG. 2 illustrates a view in longitudinal section showing a lifting means and a means for loading the trollies according to the invention;

FIG. 3 illustrates a lifting means with a rod of a pushing means in a fully extended position to push a piece goods onto a trolley;

FIG. 4 illustrates the rod of the pushing means withdrawn into a cylinder; and

Figure 1:
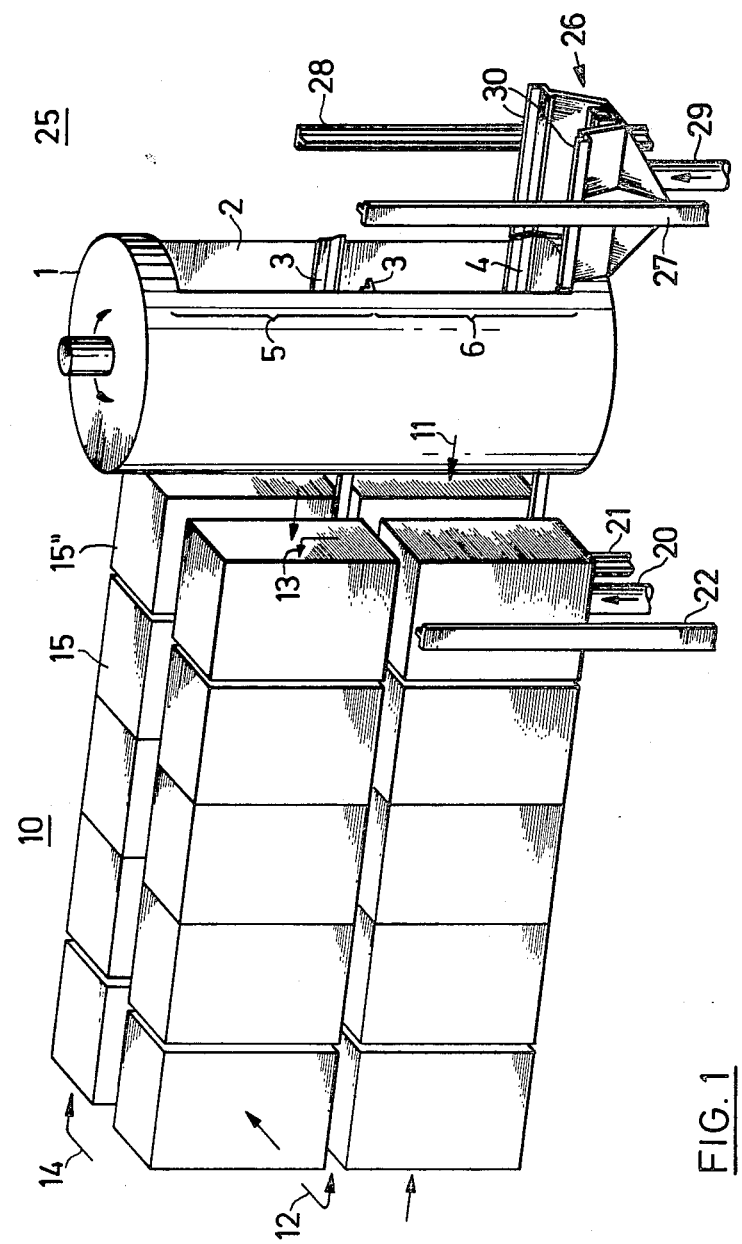
FIG. 1 illustrates a diagrammatic perspective view of an irradiation apparatus according to the invention.

Referring to FIG. 1, the apparatus for irradiation of a sequence of piece goods 15 (individual articles) includes an irradiation chamber 10 (shown in part in schematic manner) which is constructed in a suitable manner to receive and irradiate a conveyed sequence of piece goods in two levels. The chamber 10 is separate from the surrounding environment, at least in part, by a shielding wall (not shown) in which a rotary lock 1 is disposed.

The rotary lock 1 is made of a radiation-absorbing material and has an oblong-shaped hollow interior 2 within which two pairs of rails 3,4, formed by angle pieces, are disposed in vertically spaced relation. The upper rails 3 are located about half-way up the lock interior 2 at opposite sidewalls and have ends which terminate at the periphery of the lock 1. The rails 3 subdivide the lock 1 into two levels 5, 6. The rails 4 are of similar construction and are provided along the bottom edge of the interior space 2.

The irradiation chamber 10 also has a conveying means (not shown) therein for conveying a sequence of the piece goods 15 through two levels via four rows (or aisles) 11–14 each of which has five positions for the articles to be irradiated. The rows 11, 12 are on the bottom level of the chamber 10 while the rows 13, 14 are on the top level thereof. The conveying means employs a plurality of trollies (not shown in FIG. 1) to convey the piece goods in each of the positions in the four rows 11–14. The trollies, with the piece goods 15 on them, are moved sequentially along the rows 11–14 around a vertical irradiation wall (not shown) disposed between, on the one hand, the rows 11, 14 and, on the other hand, the rows 12, 13. The trollies are transferred from row 11 to row 12 and from row 13 to row 14 by means of low rail-fitted traversers onto which the trollies move. A lifting device, only an actuating cylinder 20 of which is shown, raises the goods 15 at the end of the row 12 from the bottom level to the beginning of the top-level row 13. The lifting device is guided vertically on two T-section members 21, 22. A lifting means for conveying a trolley between the levels 5, 6 of the rotary lock 1 is disposed immediately adjacent the lock 1 and includes a platform 26 which is adapted to move vertically between two T-shaped guide rails 27, 28 on the right-hand outside surface 25 of the screening wall of the chamber 10. A piston rod 29' of a hydraulic actuating cylinder 29 carries the platform 26. The platform 26 has a pair of angle-rails 4 and, with the platform 26 in its top position, register with the angle-rails 3 of the lock 1. As shown in FIG. 1, the platform 26 is disposed opposite the bottom level 6 of the rotary lock 1.

Referring to FIG. 2, the irradiation apparatus also has a feed means 35 for loading the trollies 38 (only one of which is shown) with the piece goods. In the position illustrated a trolley 38 is disposed on the platform 26 of the lifting means and is receiving a piece goods 15'. The trolley 38 is constructed of a carrying plate 39 and four wheels 43 which are interconnected in pairs by two shafts 41, 42.

Figure 5:
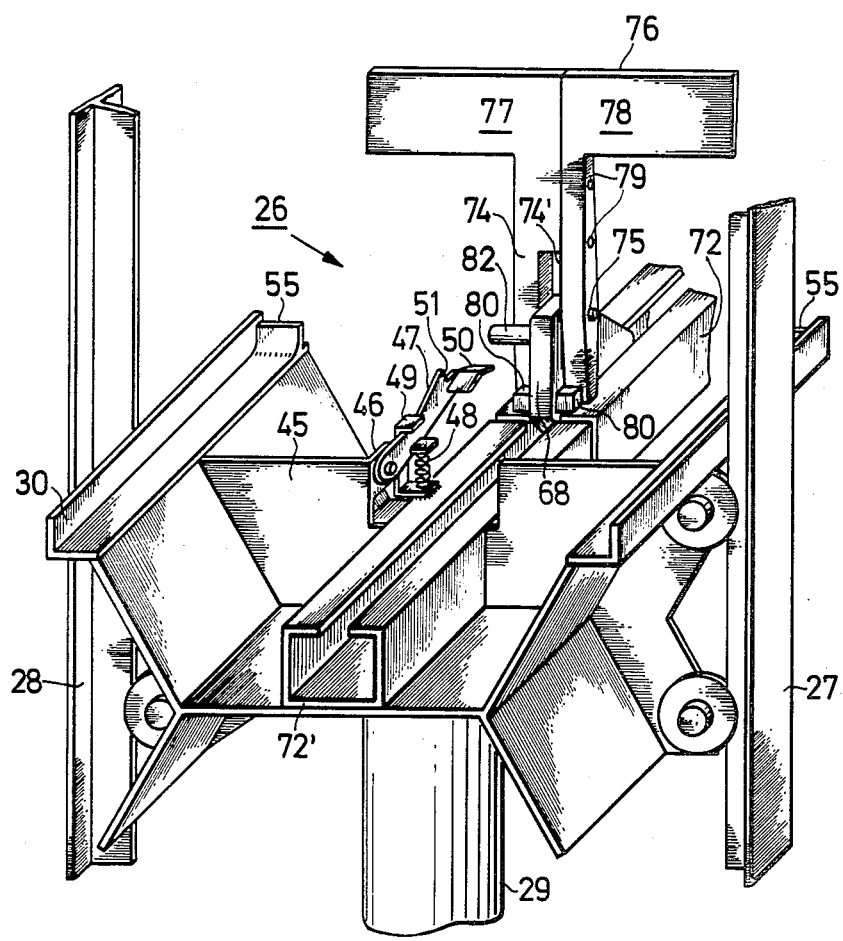
FIG. 5 illustrates a perspective view of a lifting means according to the invention.

The lifting means includes a trolley locking device for releaseably locking a respective trolley 38 in a preset position on the lifting means. As shown in FIG. 5, this locking device is in the form of a pawl 47 which is pivotally mounted on a leg 46 of a cross-wall 45 of the platform 26 and is biassed into engagement with an abutment 49 fixed to the cross-wall 45 by a spring 48. The pawl 47 has a cam or coping-like member 50 and a locking projection 51 for engaging a trolley shaft or axle 42 (see FIG. 2).

Abutments 55 are also formed on the rails 30 of the platform 26 at the end remote from the lock 1 (to the right as shown in FIG. 5) in order to prevent movement of a trolley off the platform 26 at that end.

The feed means 35 comprises a roll conveyor in two parts 56, 57. The rollers 58, 59 of the parts 56, 57 respectively are driven by longitudinal shafts and friction wheels (not shown) at a speed such that the rotational velocity of the rollers 59 of the part 57 when unbraked, is considerably greater than the rotational velocity of the rollers 58 of the part 56. In addition, a reciprocally mounted abutment 60 is provided between the two roll conveyor parts 56, 57 and is controlled via a means (not shown) to move from the position shown in FIG. 2 to the position shown in FIG. 4.

A pushing means for pushing a piece goods 15 onto a trolley 38 on the rails 30 of the lifting means is located below the feed means 35. As shown, the pushing means has an actuating cyliner 65 associated with a rod 66 which is disposed below the roll conveyor parts 56, 57. The rod 66 has a head 67 in the form of a vertical plate 68 at the free end which carries two rotatable rollers 69, 70 on both sides. The rollers 69, 70 rest on a base 72' of a C-section girder 72 of rectangular cross-section which functions as a stationary guideway to guide the rod 66 in movably mounted relation. The pushing means also has an arm 78 which is T-shape with a forked part 74 pivotally mounted on the plate 68 via a pin 75. The arm 76 is in two parts 77, 78 which are secured to one another by screws 79. A raising spring (not shown) is disposed in an aperture 74' (FIG. 5) of the forked part 74 and tends to push the arm 76 upright against stops 80 secured to the plate 68. A pin 82 is also secured to the plate 68 which, if necessary, rides up on the cam 50 of the pawl 47 and acts as a means for releasing the trolley locking device (pawl 47) after pushing of a piece goods on the trolley 38. As indicated in FIG. 4, the arm 76 is disposed to pivot into parallel relation with the rod 66 to permit movement of a piece goods 15 thereby and to thereafter pivot into perpendicular relation with the rod 66.

The apparatus operates as follows:

An irradiated piece goods 15" together with its trolley 38 in row 14 is moved into the top level 5 of the rotary lock 1; the lock 1 has for this purpose been rotated into a position such that the hollow interior 2 faces towards the chamber 10. The rails 3 of the lock 1 can be inclined slightly rearwardly or be formed with recesses 85, as shown in FIG. 2 for the angle-rails 4, to locate the trolley 38 in the hollow interior 2 of the lock 1. The lock 1 is then rotated through 180° via suitable means so that the hollow interior 2 faces towards the lifting platform 26, the same having meanwhile moved into its top position in which the platform 26 is opposite level 5 of the lock 1. Pulling means (not shown) connected preferably to the trolley 38 then operate to move the trolley 38 from its located or secured position on to the platform 26. The pulling means may be of any suitable type, for example annular to those disclosed in U.S. Pat. No. 4,081,348 at FIG. 4. As the trolley 38 moves on to the platform 26, the trolley front axle 42 depressed the pawl 47. As the wheels 43 abut the abutments 55, the spring 48 moves the pawl 47 back behind the axle 42, so that the axle is caught behind the projection 51 of the pawl 47 and the trolley 38 is in a secured or preset position on the lifting platform 26.

The irradiated piece goods or article is then removed from the trolley 38 and placed on a roll table or conveyor belt for removal thereby. During this step and the following steps one of the known movement step sequences of the trollies carrying the piece goods takes place along the irradiation wall inside the chamber 10.

The actuator 29 then moves the platform 26 containing the now empty trolley 38 into the bottom position opposite level 6 of the lock 1. A number 88, 89 and so on of piece goods or articles awaiting irradiation are present at the abutment 60 and the rod 66 is in a withdrawn position inside the cylinder 65 as shown in FIG. 4. Abutment 60 then descends. The friction rollers rotate the rollers 58 so that the portions to the right of the abutment 60 move to the left from the roll way 56 on to the roll way 57, the penultimate piece goods or article 88 changing over the position of the arm 76 against the force of the raising spring. When the center of gravity of the piece goods 88 is above the rollers 59, which run faster than the rollers 58, a gap arises between the piece goods 88 and the next piece goods 89.

After the end of piece goods 88 has passed beyond the abutment 60, the abutment 60 returns to a step or retention position. The passage of the piece goods 88 releases the arm 76 shortly afterwards so that the raising spring raises the arm 76. The rod 66 therefore releases and can act by way of the arm 76 to move the piece goods on to the trolley 38 located on the platform 26, as can be seen in FIG. 2. Once the entire length of the piece goods 88 is present on the trolley 38, the pin 82 of the plate 68 presses on the cam member 50 of the pawl 47 to release the securing of the trolley 38. The arm 76 then moves onto the rails 4 and into the bottom level 6 of the lock 1. During this final part of the stroke of the cylinder 65, the head 67 of the rod 66 moves in a C-section guideway 72' of the platform 26 which registers with the guideway 72 of the pushing means. The trolley front wheels engage in the recesses 85 in the rails 4 to locate the trolley 38 in the lock 1. Rod 66 then moves back into the cylinder 65, whereafter the lock 1 rotates 180° around a vertical axis. Thereafter, the piece goods for irradiation moves via suitable means from the bottom level 6 into the chamber 10 and rotates around the irradiation source wall in known manner.

Instead of being discharged and removed from the trolley 38 on the upper or top level of the platform 26, the irradiated articles can be lowered on the platform 26 and removed therefrom in its bottom position and e.g. removed from the system laterally. In this event, however, the guide rails 27, 28 would have to extend diagonally to the rectangular ground plan of the platform 26.

Since the height of each level 5, 6 in the chamber 10 is something of the order of magnitude of 1 meter, depending upon the height of the treatment material, but the vertical spacing between the stacking areas for unirradiated and irradiated articles outside the chamber is of the order of magnitude of 2 meters, it may be convenient for material for irradiation to be supplied via the top level 5 of the lock 1 and for irradiated material to be removed via the bottom level 6 of the lock 1. In this event, the roll table portion 57 can slope down in the conveying direction so that the rollers 58 do not have to be driven. Further, after the abutment 60 has descended, the portion 88 is rolled by the rollers 58 onto the inclined roll table part 57, where the portion 88 accelerates automatically by gravity so that the required spacing for the engagement of the arm 76 arises. A downwards-sloping roll way or the like can, in this case, follow on from the bottom position of the platform 26. Of course, in a system of this kind, the lifting means inside the chamber 10 must lower instead of raising the articles being treated. Also, the moving of the articles onto the trollies and their removal therefrom cannot take place in the vertical plane determined by the axis of the lock 1 and by the axis of the platform 26. Thus, it may be advantageous if, at least, the removal of the articles is effected in a plane perpendicular to the latter vertical plane.

Also, means which are operative from the rotary lock can be used to move the articles on the trolley into and/or out of the lock, in a manner disclosed e.g. in U.S. Pat. No. 4,081,348.

What is claimed is:

1. An apparatus for irradiation of piece goods, said apparatus comprising
    an irradiation chamber;
    a conveying means in said chamber including a plurality of trollies for conveying a sequence of piece goods through two levels within said chamber;
    a rotary lock for introduction and removal of each piece goods of the sequence of piece goods into and out of said chamber, said rotary lock having two levels, one of said levels being disposed to permit entry of a piece goods into said chamber and the other of said levels being disposed to permit exit of a piece goods from said chamber; and
    a lifting means for conveying empty trollies between said levels of said rotary lock, said lifting means being disposed before and immediately adjacent said rotary lock.

2. An apparatus as set forth in claim 1 wherein said rotary lock includes two pairs of rails disposed in vertically spaced relation, and said lifting means includes a pair of rails for respective registering with each pair of said rails of said rotary lock.

3. An apparatus as set forth in claim 1 wherein said lifting means includes a trolley locking device for releaseably locking a respective trolley in a present position on said lifting means.

4. An apparatus as set forth in claim 3 which further comprises pushing means for pushing a respective piece goods onto a trolley in said preset position and for thereafter pushing said trolley with the piece goods thereon into said rotary lock and a means for releasing said locking device after pushing of the piece goods onto said trolley in said preset position.

5. An apparatus as set forth in claim 4 wherein said rotary lock includes means for releasably securing a respctive trolley therein.

6. An apparatus as set forth in claim 4 wherein said pushing means includes a reciprocally mounted pusher rod and a first stationary guideway having said rod movably mounted therein and wherein said lifting means includes a second guideway for registering with said first guideway to guide said rod therein.

7. In an apparatus for irradiation of piece goods, the combination comprising
    a plurality of trollies for conveying a sequence of piece goods through an irradiation chamber;
    a rotary lock having two levels, one of said levels being disposed to permit entry of a trolley thereinto and the other of said levels being disposed to permit exit of a trolley therefrom; and
    a lifting means for conveying a trolley between said levels, said lifting means being disposed immediately adjacent said rotary lock.

8. The combination as set forth in claim 7 wherein said rotary lock is vertically disposed and has two pairs of rails disposed in vertically spaced relation and said lifting means includes a pair of rails for respectively registering with each pair of rails of said rotary lock to permit rolling of a respective trolley between said lifting means and each said level of said rotary lock.

9. The combination as set forth in claim 8 wherein said lifting means includes a trolley locking device for releaseably locking a trolley in a preset position on said lifting means.

10. The combination as set forth in claim 8 which further comprises a pushing means for pushing a piece goods onto a trolley on said rails of said lifting means and for thereafter pushing said trolley with the piece goods thereon into one of said levels of said rotary lock.

11. The combination as set forth in claim 10 wherein said lifting means includes a trolley locking device for releaseably locking a trolley in a preset position on said lifting means.

12. The combination as set forth in claim 10 wherein said pushing means includes a reciprocally mounted pusher rod and a first stationary guideway having said rod movably mounted therein and wherein said lifting means includes a second guideway for registering with said first guideway to guide said rod therein.

13. The combination as set forth in claim 12 wherein said pushing means further includes a pivotally mounted arm secured to said rod, said arm being disposed to pivot into parallel relation with said rod to permit movement of a piece goods thereby and to thereafter pivot into perpendicular relation with said rod to push the piece goods onto a trolley on said lifting means.

* * * * *

UNITED STATES PATENT AND TRADEMARK OFFICE
CERTIFICATE OF CORRECTION

PATENT NO. : 4,281,954
DATED : August 4, 1981
INVENTOR(S) : Ernst Bosshard

It is certified that error appears in the above—identified patent and that said Letters Patent is hereby corrected as shown below:

Column 2, line 33, change "separate" to --separated--

Column 4, line 18, after "example" change "annular" to --similar--

Signed and Sealed this

Twenty-fourth Day of November 1981

[SEAL]

*Attest:*

GERALD J. MOSSINGHOFF

*Attesting Officer*     *Commissioner of Patents and Trademarks*